United States Patent [19]

Berta

[11] Patent Number: 4,624,989

[45] Date of Patent: Nov. 25, 1986

[54] THERMOPLASTIC ELASTOMERS CONTAINING CROSS-LINKED EPIHALOHYDRIN RUBBERS

[75] Inventor: Dominic A. Berta, Wilmington, Del.

[73] Assignee: Hercules Incorporated, Wilmington, Del.

[21] Appl. No.: 824,499

[22] Filed: Jan. 31, 1986

[51] Int. Cl.[4] .................... C08L 23/04; C08L 23/10; C08L 23/28; C08L 63/00

[52] U.S. Cl. .................................. 525/187; 525/232; 525/195; 525/194; 525/192; 524/487; 524/528; 524/502

[58] Field of Search ................. 525/187, 192; 524/487

[56] References Cited

U.S. PATENT DOCUMENTS 4,032,479  6/1977  Bannomori et al. ................ 525/411
4,251,648  2/1981  Oetzel .................... 525/187
4,408,013  10/1983  Barnhouse ................ 525/187
4,463,136  7/1984  Barnhouse ................ 525/187

OTHER PUBLICATIONS

Paul–"Interfacial Agents (Compatibilizers) for Polymer Blends, 12/78—Polymer Blends, vol. 2—Academic Press—pp. 35-62.

Primary Examiner—Carman J. Seccuro
Attorney, Agent, or Firm—William E. Player

[57] ABSTRACT

Disclosed is a thermoplastic elastomer containing a cross-linked polyepihalohydrin rubber made by simultaneously cross-linking the rubber and blending the rubber with a crystalline polyolefin in the presence of a chlorinated hydrocarbon having a chlorine content of about 20% to about 70% by weight.

11 Claims, No Drawings

THERMOPLASTIC ELASTOMERS CONTAINING CROSS-LINKED EPIHALOHYDRIN RUBBERS

This invention relates to compositions containing cross-linked epihalohydrin rubbers.

Polyepihalohydrin rubbers can be simultaneously molded and cross-linked to make articles having good elastic properties, such as gaskets and hoses. However, the cross-linking reactions interfere with molding by increasing the viscosity and slowing the flow of the rubber into the mold. As a result, the mold may not be completely filled when the rubber irreversibly cures and stops flowing. The final product is then defective and must be discarded.

Furthermore, scrap generated during molding and cross-linking polyepihalohydrin rubbers must also be discarded. Scrap is generated when rubber flows through the seams of the mold during processing. After molding, scrap is cut from the molded article, but due to its thermoset nature, it cannot be reused.

Thermoplastic resins, on the other hand, such as crystalline polyolefins, are easily molded because there are no simultaneous cross-linking reactions to interfere with flow properties. Scrap can also be reused because it is not irreversibly set. However, thermoplastic resins are too rigid for use in molded articles requiring elasticity.

Thermoplastic elastomers are compositions that have the melt flow characteristics of thermoplastic resins while exhibiting the elastic properties of thermoset rubbers.

It would be advantageous to combine the properties of cross-linked (cured) polyepihalohydrin rubber with the properties of a thermoplastic resin, such as crystalline polypropylene, to provide a composition that can be molded like the thermoplastic resin and yet display the good elastic properties of the cross-linked rubber. However, attempts to blend polypropylene with cross-linked polyepihalohydrin rubber have in the past not proved successful since the two are not compatible, i.e., a non-homogeneous, cheese-like material having poor physical properties resulted when the two were combined.

According to the instant invention a composition is provided comprising a substantially homogeneous blend of a cross-linked polyepihalohydrin rubber, a crystalline polyolefin and a chlorinated hydrocarbon. The composition is made by blending the (non-cross-linked) polyepihalohydrin rubber and the crystalline polyolefin in the presence of the chlorinated hydrocarbon, and then cross-linking the polyepihalohydrin in situ. The composition of this invention is a thermoplastic elastomer that displays good elastic properties, can be easily processed by molding techniques, such as extrusion and injection molding, and is remoldable like a typical thermoplastic.

The polyepihalohydrin rubber (non-cross-linked) useful in accordance with the instant invention is a saturated or unsaturated homopolymer, copolymer, terpolymer or a mixture thereof. Homopolymers such as polyepichlorohydrin, polyepibromohydrin, polyepiiodohydrin, polyepifluorohydrin and copolymers of these homopolymers are exemplary. Other epihalohdrin copolymers are, for example, epihalohydrins with comonomer epoxide compounds, such as ethylene oxide, propylene oxide, butylene oxide, styrene oxide, phenylglycidyl ether, allylglycidyl ether and glycidylmethacrylate. A preferred copolymer is an epichlorohydrin-ethylene oxide copolymer. Terpolymers are, for example, epihalohydrins copolymerized with two monomers selected from the above comonomers. A preferred terpolymer is an epichlorohydrin-ethylene oxide-allylglycidyl ether terpolymer.

The chlorinated hydrocarbon useful in accordance with this invention is saturated and has a chlorine content by weight of from about 20% to about 70%, preferably from about 25% to about 67%, more preferably from about 25% to about 42%. Useful chlorinated hydrocarbons are known chlorinated paraffins, known chlorinated polyolefins such as chlorinated polyethylene and chlorinated polyisoprene, and mixtures thereof. Unsaturated polyolefins, e.g., polyisoprene, are chlorinated until no unsaturation remains. Other useful chlorinated hydrocarbons will be apparent to those skilled in the art.

Preferably, the chlorinated hydrocarbon has crystallinity, by weight, from about 1% to about 50%, more preferably from about 2% to about 30%, and most preferably from about 2% to about 25%. Although not required in the instant invention, crystallinity in the chlorinated hydrocarbon is preferred, since it adds strength to the composition.

The crystalline polyolefin useful in accordance with the instant invention is a high molecular weight solid product made from the polymerization of one or more olefins by either high pressure or low pressure processes. The polyolefin has crystallinity, by weight, from about 20% to about 80%, preferably from about 30% to about 60%. The useful olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. The polyolefin can be an isotactic or syndiotactic olefin polymer, e.g., polyethylene or polypropylene, that is commercially available. Polypropylene is preferred. Mixtures of the polyolefins are also useful.

As stated previously, the composition of this invention is prepared by simultaneous blending and cross-linking. Thus, the composition is prepared by blending a mixture of the polyepihalohydrin, softened or molten polyolefin, and liquid, softened, or molten chlorinated hydrocarbon with a suitable curing system for the polyepihalohydrin, and then masticating the blend at a temperature that maintains the melt and promotes curing until the desired cure is obtained. Conventional masticating equipment, for example, Banbury mixers and Brabender mixers, is used.

The curing system used in accordance with the invention cures the polyepihalohydrin in preference to the crystalline polyolefin and the chlorinated hydrocarbon. The system comprises a cross-linking agent and one or more curing accelerators. Examples of useful cross-linking agents are substituted thioureas and thiobiureas such as ethylene thiourea, trimethyl thiourea, 1,3-diethylthiourea, and 1,3-dibutylthiourea, substituted mono- or dithiobiureas, such as 1-methyl-2,5-dithiobiurea, 1-isopropyl-2,5-dithiobiurea, 1-allyl-2,5-dithiobiurea, and 1-phenyl-2,5-dithiobiurea, the di- and trithiols such as the dimercapto-1,3,4-thiadiazoles disclosed in U.S. Pat. No. 4,128,510, incorporated herein by reference, the 2,4-dithiohydantoins disclosed in U.S. Pat. No. 4,342,851, incorporated herein by reference, the dimercaptotriazoles disclosed in U.S. Pat. No. 4,234,705, incorporated herein by reference, and trithiocyanuric acid, and the thioester derivatives of the di- and trithiols.

It will be apparent to those skilled in the art that the particular accelerators used in accordance with the instant invention will depend on the particular crosslinking agent used.

For use with the thiourea and thiobiurea type crosslinking agents, examples of useful accelerators are elementary sulfur and organic bases such as thiuram sulfides, thiazole and thiazole derivatives, dithiocarbamates, and sulfenamides, specific examples of which are dipentamethylenethiuram tetrasulfide, tetramethylthiuram disulfide, cadmium pentamethylenedithiocarbamate, tellurium dimethyldithiocarbamate, piperidino pentamethylenedithiocarbamate, and 2-mercaptobenzothiazole. Additional useful accelerators are inorganic bases that are hydroxides, oxides, or carbonates of metals of Groups Ia and IIa of the Mendeleef Periodic Table as disclosed in Moeler, *Inorganic Chemistry*, John Wiley & Sons, 1959, p.123. A preferred curing system comprises the thiourea or thiobiurea type cross-linking agent, the Group Ia or IIa inorganic base accelerator, and sulfur or the organic base accelerator.

For use with the di- and trithiol type cross-linking agents, examples of useful accelerators are basic amines as disclosed in U.S. Pat. No. 4,288,576, incorporated herein by reference, and inorganic bases that are metal compounds of Groups II and IVb of the Mendeleef Periodic Table. Of course, it will be apparent to those skilled in the art that, although the basic amines crosslink isolated chlorinated hydrocarbons, such as chlorinated polyethylene, the amines preferably cure polyepihalohydrins in a chlorinated hydrocarbon-polyepihalohydrin mixture. The Group II and IVb metal compounds are, for example, hydroxides, carbonates, carboxylates, silicates, borates, and phosphites of metals of Group II of the periodic table, preferably Mg, Ba, Ca and Zn, and oxides, basic carbonates, basic carboxylates, basic phosphites, basic sulfites, and tribasic sulfates of metals of Group IVb of the periodic table, preferbly Sn and Pb. Specific examples are magnesia, magnesium hydroxide, barium hydroxide, magnesium carbonate, barium carbonate, quick lime, slaked lime, calcium carbonate, calcium silicate, calcium stearate, zinc stearate, calcium phthalate, magnesium phosphite, calcium phosphite, zinc oxide, tin oxide, litharge, red lead, white lead, dibasic lead phthalate, dibasic lead carbonate, tin stearate, basic lead phosphite, basic tin phosphite, basic lead sulfite, and tribasic lead sulfate. A preferred curing system comprises the di- or trithiol cross-linking agent combined with the basic amine and the Group II or IVb metal compound.

Generally, the amount of the cross-linking agent varies from about 0.1 phr to about 20 phr, preferably from about 0.5 phr to about 5 phr. The amount of curing accelerator generally varies from about 0.1 phr to about 20 phr, preferably from about 0.5 phr to about 5 phr. The specific amounts are determinable by those skilled in the art, and vary depending upon the cross-link density desired, the amount and type of polyepihalohydrin used, the accelerator used, the cross-linking agent used, and the curing condition temperature. The term "phr" is well known to those skilled in the art to measure additives in rubber compounding and refers to 100 parts by weight of the total rubber in a composition, which in the instant invention refers to 100 parts by weight of the polyepihalohydrin rubber, plus the chlorinated hydrocarbon plus the crystalline polyolefin in the composition.

Based upon 100% by weight of the total polymer (i.e., polyepihalohydrin, chlorinated hydrocarbon, and crystalline polyolefin) in the composition of this invention: the amount of polyepihalohydrin may vary from about 20% to about 80% preferably from about 35% to about 70%; the amount of crystalline polyolefin may vary from about 8% to about 60%, preferably from about 12% to about 40%; and the amount of chlorinated hydrocarbon may vary from about 8% to about 60%, preferably from about 12% to about 40%.

In curing and blending simultaneously, the polyepihalohydrin, crystalline polyolefin, and chlorinated hydrocarbon are intimately mixed at a temperature sufficient to soften the polyolefin and chlorinated hydrocarbon, or a temperature sufficient to melt the hydrocarbon if it is partially crystalline. The curing system is then blended into the molten mixture. The blend is then simultaneously heated at curing temperatures and masticated until the polyepihalohydrin crosslinking reaction is substantially complete. Curing temperatures vary generally from about 120° C. to about 250° C., preferably from about 150° C. to about 225° C., and more preferably from about 170° C. to about 200° C. Generally, curing time varies from about 1 minute to about 1 hour, preferably from about 3 minutes to about 15 minutes. It will be apparent to those skilled in the art that specific curing times will depend on the blend, cure system, and curing temperature used.

The properties of the composition made according to this invention may be modified, either before or after curing, by addition of ingredients which are conventional in the compounding of polyepihalohydrin rubbers, crystalline polyolefins, and chlorinated hydrocarbons. Examples of such ingredients include particulate fillers, such as carbon black, silica, titanium dioxide, colored pigments, clay, zinc oxide, and stearic acid, stabilizers, antidegradants, flame retardants, processing aids, adhesives, tackifiers, plasticizers, wax, discontinuous fibers, such as wood cellulose fibers, and extender oils. The addition of carbon black, extender oil or both, preferably prior to curing, are particularly recommended. Carbon black improves the tensile strength. Extender oil can improve the resistance to oil, swell, heat, stability, hysteresis, cost and permanent set of the composition. Aromatic, naphthenic and paraffinic extender oils are satisfactory. The addition of extender oil can also improve processability.

The compositions of the invention are useful for making a variety of articles such as hoses, belts, gaskets, moldings and other molded parts. They are particularly useful for making articles by extrusion, injection, or compression molding techniques. They also are useful for modifying thermoplastic resins, in particular, polyolefin resins.

The following Examples are illustrative of the invention, but the invention is not restricted thereto. All parts and percentages used are by weight, unless indicated otherwise. The physical properties, excepting compression set, are determined in accordance with the test procedures set forth in ASTM D-412-80. Compression set is determined in accordance with ASTM D395, Method B, by compressing the sample for 22 hours at 100° C.

EXAMPLES

Fourteen examples of the invention are prepared along with four controls. The ingredients of the controls are listed in Table 1, and the ingredients of the examples are listed in Tables 2, 3 and 4.

A Brabender mixer is used to compound the ingredients. The polyepichlorohydrin is added along with the polypropylene, stabilizers, and chlorinated polyethylene and mixed for about 5 minutes at a jacket temperature of 204° C. and an RPM of about 60. The curing system is then added, one ingredient at a time with the accelerator being last and the composition mixed for 7 minutes or more until a constant Brabender viscosity (i.e., torque) is reached. The composition is removed and allowed to cool. The sample is remixed in the Brabender for 3 minutes at 204° C., removed from the Brabender and compression molded into plaques at 221° C. for 3 minutes with 15 ton pressure. Specimens are cut and tested.

The fourteen examples are tested for physical properties, and the results are listed in Tables 2, 3, and 4.

The four controls (i.e., containing a rubber and a crystalline polyolefin, but no chlorinated hydrocarbon) are listed in Table 1. However, they did not yield homogenous blends and could not be tested for physical properties due to their poor integrity.

Comparison of the four controls with the fourteen examples shows that the addition of the chlorinated hydrocarbon compatibilizes the cross-linked epihalohydrin rubber and the crystalline polyolefin to produce an elastic composition having good physical properties, whereas without the addition of the chlorinated hydrocarbon a practically useless, non-homogenous composition is obtained.

TABLE 1

| Ingredients | Control | | | |
|---|---|---|---|---|
| | 1 | 2 | 3 | 4 |
| | Parts | | | |
| copolymer of ethylene oxide and epichlorohydrin[1] | 75 | 50 | 25 | 75 |
| polypropylene[2] | 25 | 50 | 75 | — |
| copolymer of propylene and 1-butene[3] | — | — | — | 25 |
| stearic acid (processing aid) | 1.0 | 1.0 | 1.0 | 1.0 |
| phenolic antioxidant[4] | 0.1 | 0.1 | 0.1 | 0.1 |
| nickel dimethyl-dithiocarbonate (stabilizer) | 1.0 | 1.0 | 1.0 | 1.0 |
| 2-mercapto-1,3,4-thiadiazole 5-benzoate (cross-linking agent) | 2.0 | 2.0 | 2.0 | 2.0 |
| magnesium oxide (inorganic curing accelerator) | 3 | 3 | 3 | 3 |
| butyraldehyde-aniline condensation product (organic curing accelerator) | 2.0 | 2.0 | 2.0 | 2.0 |

[1]approximately 36% by weight ethylene oxide and 64% by weight epichlorohydrin
[2]homopolymer having a density of about 0.91 gm/cm³
[3]approximately 5% by weight 1-butene
[4][methylene-3-(3,5-ditert-butyl-4-hydroxyphenyl)propionate] methane

TABLE 2

| | Example | | | | | |
|---|---|---|---|---|---|---|
| | 1 | 2 | 3 | 4 | 5 | 6 |
| Ingredients | Parts | | | | | |
| copolymer of ethylene oxide and epichlorohydrin[1] | 75 | 65 | 55 | 65 | 65 | 55 |
| copolymer of propylene and 1-butene[2] | 12.5 | 17.5 | 12.5 | 12.5 | 22.5 | 22.5 |
| chlorinated polyethylene[3] | 12.5 | 17.5 | 32.5 | 22.5 | 12.5 | 22.5 |
| stearic acid (processing aid) | 1.0 | 1.0 | 1.0 | 1.0 | 1.0 | 1.0 |
| nickel dimethyl-dithiocarbonate (stabilizer) | 1.0 | 1.0 | 1.0 | 1.0 | 1.0 | 1.0 |
| phenolic antioxidant[4] | 0.1 | 0.1 | 0.1 | 0.1 | 0.1 | 0.1 |
| 2-mercapto-1,3,4-thiadiazole-5-benzoate (cross-linking agent) | 2.0 | 1.75 | 2.0 | 1.75 | 1.75 | 1.5 |
| magnesium oxide (inorganic curing accelerator) | 3.0 | 2.5 | 3.0 | 2.5 | 2.5 | 2.0 |
| butyraldehyde-aniline condensation product (organic curing accelerator) | 2.0 | 1.75 | 2.0 | 1.75 | 1.75 | 1.5 |
| Physical Properties | | | | | | |
| 100% Modulus, psi | 160 | 330 | 240 | 220 | 530 | 640 |
| 200% Modulus, psi | — | 430 | 380 | — | — | 730 |
| Tensile Strength, psi | 210 | 440 | 520 | 310 | 530 | 730 |
| % Elongation | 197 | 200 | 320 | 180 | 100 | 200 |
| Shore A Hardness | 52 | 68 | 70 | 55 | 83 | 83 |
| % Compression Set 22 hr/100° C. | 59 | 65 | 70 | 49 | 59 | 72 |

[1]approximately 36% by weight ethylene oxide and 64% by weight epichlorohydrin
[2]approximately 5% by weight 1-butene
[3]approximately 36% by weight chlorine, a density of 1.16 gm/cm³, and less than 2% residual crystallinity, estimated by Heat of Fusion
[4]same as used in Table 1

TABLE 3

| | Example | | | | |
|---|---|---|---|---|---|
| | 7 | 8 | 9 | 10 | 11 |
| Ingredients | Parts | | | | |
| copolymer of propylene and ethylene[1] | — | — | — | 22.5 | — |
| polyepichlorohydrin | 55 | 55 | — | 55 | — |
| terpolymer of ethylene oxide, epichlorohydrin and allylglycidylether[2] | — | — | 55 | — | — |
| polypropylene[3] | 22.5 | 22.5 | 22.5 | — | 22.5 |
| chlorinated polyisoprene[4] | — | 22.5 | — | — | — |
| chlorinated parafin[5] | 22.5 | — | — | — | — |
| chlorinated polyethylene[6] | — | — | 22.5 | 22.5 | 22.5 |
| copolymer of propylene oxide and epichlorohydrin[7] | — | — | — | — | 55 |
| stearic acid (processing aid) | 1 | 1 | 1 | 1 | 1 |
| methyl niclate (stabilizer) | 1 | 1 | 1 | 1 | 1 |
| phenolic antioxidant[8] | 0.1 | 0.1 | 0.1 | 0.1 | 0.1 |
| 2-mercapto-1,3,4-thiadiazole-5-benzoate (cross-linking agent) | 1.5 | 1.5 | 1.5 | 1.5 | 1.5 |
| magnesium oxide (inorganic curing accelerator) | 2.0 | 2.0 | 2.0 | 2.0 | 2.0 |
| butyraldehyde-aniline condensation product (organic curing accelerator) | 1.5 | 1.5 | 1.5 | 1.5 | 1.5 |
| Physical Properties | | | | | |
| 100% Modulus, psi | 460 | 580 | 630 | 510 | 410 |
| 200% Modulus, psi | 520 | 640 | 720 | 600 | 480 |
| Tensile Strength, psi | 780 | 810 | 750 | 720 | 690 |
| % Elongation | 280 | 210 | 210 | 250 | 310 |
| Shore A Hardness | 72 | 78 | 81 | 76 | 69 |
| % Compression Set 22 hr./100° C. | 68 | 70 | 69 | 70 | 66 |

[1]random copolymer of propylene and ethylene with about 2.7% by wt. ethylene and a density of 0.89 gm/cm³
[2]about 6% by wt. allylglycidylether, 33% by wt. ethylene oxide and 61% by wt. epichlorohydrin
[3]homopolymer with a density of about 0.91 gm/cm³
[4]about 64% by wt. chlorine, a density of 1.6 gm/ml, and a softening point of 140° C.
[5]paraffin wax with about 38% by wt. chlorine, a density of about 1.12 gm/cm³, a viscosity of about 3 poise at 25° C.
[6]about 36% by wt. chlorine, a density of 1.16 gm/cm³, and less than 2% residual crystallinity by Heat of Fusion.
[7]about 60% by wt. propylene oxide and 40% by wt. epichlorohydrin.
[8]same as Table 1

TABLE 4

| Ingredients | Example 12 | Example 13 | Example 14 |
|---|---|---|---|
| | Parts | | |
| copolymer of ethylene oxide and epichlorohydrin[1] | 55 | 55 | 55 |
| copolymer of propylene and 1-butene[2] | 22.5 | 22.5 | 22.5 |
| chlorinated polyethylene[3] | 22.5 | 22.5 | 22.5 |
| stearic acid (processing aid) | 1 | 1 | 1 |
| methyl niclate (stabilizer) | 1 | 1 | 1 |
| phenolic antioxidant[4] | 0.1 | 0.1 | 0.1 |
| ethylene thiourea (cross-linking agent) | 1.5 | 1.5 | 1.5 |
| red lead (inorganic accelerator) | 5 | 5 | — |
| magnesium oxide (inorganic accelerator) | — | — | 5 |
| N—t-butyl-2-benzothiazylsulfenamide (organic accelerator) | — | 2 | 1 |
| Physical Properties | | | |
| 100% Modulus, psi | 610 | 590 | 580 |
| 200% Modulus, psi | 720 | 860 | 660 |
| Tensile strength, psi | 910 | 890 | 860 |
| % Elongation | 220 | 230 | 210 |
| Shore A Hardness | 80 | 79 | 78 |
| % Compression set 22 hr/100° C. | 70 | 72 | 68 |

[1] about 36% by weight ethylene oxide and about 64% by weight epichlorohydrin
[2] about 5% by weight 1-butene
[3] about 36% by weight chlorine, a density of 1.16 gm/cm$^3$, and less than 2% residual crystallinity by Heat of Fusion.
[4] same as Table 1.

I claim:

1. A composition comprising a substantially homogenous blend of a cross-linked polyepihalohydrin rubber, a crystalline polyolefin that is a polymerized mixture of one or more olefins selected from the group consisting of ethylene, propylene, 1-butene, 1-pentene, 1-hexene, 2-methyl-1-propene, 3-methyl-1-pentene, 4-methyl-1-pentene, and 5-methyl-1-hexene, and a chlorinated hydrocarbon having a chlorine content of about 20% to about 70% by weight, wherein said hydrocarbon is a chlorinated paraffin, chlorinated polyethylene, or chlorinated polyisoprene.

2. The composition of claim 1 wherein the cross-linked polyepihalohydrin rubber is cross-linked polyepichlorohydrin.

3. The composition of claim 1, wherein the cross-linked polyepihalohydrin rubber is a cross-linked copolymer of epichlorohydrin and ethylene oxide.

4. The composition of claim 1, wherein the cross-linked polyepihalohydrin rubber is a cross-linked terpolymer of epichlorohydrin, ethylene oxide, and allylglycidyl ether.

5. The composition of claim 1, wherein the polyolefin is a copolymer of propylene and 1-butene.

6. The composition of claim 1, wherein the polyolefin is polypropylene.

7. The composition of claim 1, wherein the polyolefin is polyethylene.

8. The composition of claim 1, wherein the chlorinated hydrocarbon is chlorinated polyethylene.

9. The composition of claim 1, wherein the chlorinated hydrocarbon has a chlorine content from about 25% to about 42% by weight.

10. A method making a thermoplastic elastomer comprising the steps of (a) blending a polyepihalohydrin rubber and a crystalline polyolefin that is a polymerized mixture of one or more olefins selected from the group consisting of ethylene, propylene, 1-butene, 1-pentene, 1-hexene, 2-methyl-1-propene, 3-methyl-1-pentene, 4-methyl-1-pentene, and 5-methyl-1-hexene in the presence of a chlorinated hydrocarbon having a chlorine content of about 20% to about 70% by weight, wherein said hydrocarbon is a chlorinated paraffin, chlorinated polyethylene, or chlorinated polyisoprene, and (b) simultaneously cross-linking the polyepihalohydrin rubber by heating the blend in the presence of a curing system that cross-links the polyepihalohydrin rubber in preference to the polyolefin and the hydrocarbon and comprises a cross-linking agent and at least one curing accelerator.

11. A cross-linkable composition comprising a polyepihalohydrin rubber, a crystalline polyolefin that is a polymerized mixture of one or more olefins selected from the group consisting of ethylene, propylene, 1-butene, 1-pentene, 1-hexene, 2-methyl-1-propene, 3-methyl-1-pentene, 4-methyl-1-pentene, and 5-methyl-1-hexene, a chlorinated hydrocarbon having a chlorine content of about 20% to about 70% by weight, wherein said hydrocarbon is a chlorinated paraffin, chlorinated polyethylene, or chlorinated polyisoprene, and a curing system that cross-links the rubber in preference to the hydrocarbon and comprises a cross-linking agent and at least one curing accelerator.

* * * * *